United States Patent [19]

Barr

[11] 4,111,360
[45] Sep. 5, 1978

[54] SOLAR ENERGY CONCENTRATING AND COLLECTING ARRANGEMENT AND METHOD

[75] Inventor: Irwin R. Barr, Lutherville, Md.

[73] Assignee: AAI Corporation, Cockeysville, Md.

[21] Appl. No.: 746,268

[22] Filed: Nov. 30, 1976

Related U.S. Application Data

[62] Division of Ser. No. 499,066, Aug. 20, 1974, Pat. No. 3,994,435.

[51] Int. Cl.$^2$ .................................................. F24J 3/02
[52] U.S. Cl. ..................................... 237/1 A; 126/270
[58] Field of Search ............... 237/1 A; 126/270, 271; 47/17, DIG. 6; 350/1; 60/641; 52/18, 200

[56] References Cited

U.S. PATENT DOCUMENTS

| | | | |
|---|---|---|---|
| 2,827,138 | 3/1958 | Roy, Jr. | 47/17 X |
| 3,179,105 | 4/1965 | Falbel | 126/271 |
| 3,328,926 | 7/1967 | Reinhard | 52/2 |
| 3,741,631 | 6/1973 | Laing | 47/17 X |
| 3,868,823 | 3/1975 | Ressell, Jr. et al. | 126/270 |
| 3,894,369 | 7/1975 | Schmitt | 237/1 A |

Primary Examiner—William E. Wayner
Attorney, Agent, or Firm—Reginald F. Pippin, Jr.

[57] ABSTRACT

A solar energy concentrating and collecting arrangement and method in which a semi-cylindrical oblong concave reflector/concentrator forms the roof of a house, school or other building, particularly a heat utilization building. A collector is movably supported in spaced relation above and along the length of the oblong roof/reflector, for pivotal movement to a zone of maximum confluence of solar energy rays reflected from the roof reflector as a result of variations of sun path during the various parts of the year and also to further accommodate each day's movement of the sun. Movement of the collector is by pivotal movement about an axis parallel with the center of curvature or curvatures of the roof/reflector and disposed adjacent the roof/reflector. The roof/reflector has a plurality of radii, for enabling accommodation of wide variations of the sun angles during the various seasons of the year and during each day of a given season, while still affording a desired concentration of solar energy on the collector. The concentrated solar energy collected by the collector is transferred to a fluid, such as water, passed along the length of collector, by a pump forming a part of a heat utilization system, which may include heating and/or cooling of the building and/or additional buildings or other structures. The roof/reflector is oriented with its center of curvature axes running East-West and with its surface tilted toward the Equator, the degree of tilt being dependent upon the latitude of the reflector.

18 Claims, 7 Drawing Figures

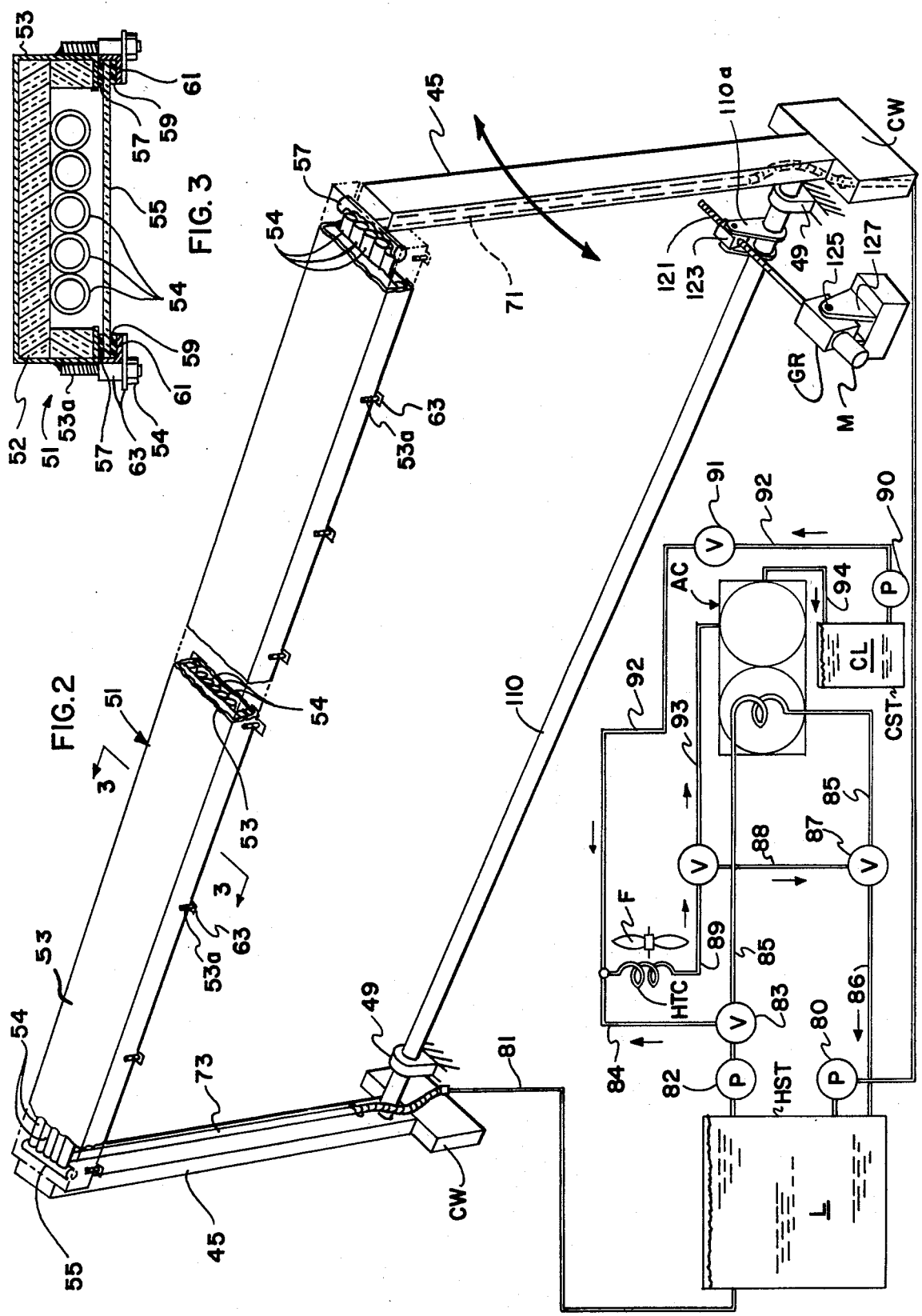

SOLAR ENERGY CONCENTRATING AND COLLECTING ARRANGEMENT AND METHOD

This is a division of application Ser. No. 499,066 filed Aug. 20, 1974, now U.S. Pat. No. 3,994,435.

This invention relates to a solar energy concentrating and collecting arrangement and method, and more particularly to such an arrangement and method as applied in conjunction with a building in which the roof forms a solar energy year-round concentrator for a movable collector which is moved to various positions for maximizing of the collected solar energy as a function of the solar angle throughout the year and during each day.

Various solar energy collection arrangements are known. Many utilize a parabolic mirror or mirrors with a collector located at the focus. These mirrors and collectors conventionally move as a unit for pointing at the sun.

Several other prior arrangements employ a stationary mirror or mirrors with a movable collector or collectors. Among these are a spherical mirror construction with a movable centrally spaced collector arranged to angularly move about a fulcrum according to the position of the sun and the season of the year. The spherical mirror employs a complex curvature which is difficult, expensive, and impractical for large manufacture. A second arrangement as shown in German Pat. No. 517,417, issued Feb. 4, 1931, uses an oblong laterally symmetrical parabolic mirror with its horizontal focus line directly vertically above the center of and symmetrical with the oblong parabolic reflector. To accommodate small variations in sun angle away from the vertical, the collector is moved both laterally and vertically through a pivoted telescoping arm and cam guideway arrangement. The compass orientation of this system is not clear in view of various inconsistencies in the description. However, in any event it appears that as a practical matter very little angular movement of the sun away from the vertical (as viewed from the end of the reflector and collector) can be accommodated with this system, and certainly not the extent of annual change of sun angle relative to the horizontal. In addition the system is relatively complex and to a considerable extent unwieldy on a large scale in view of the guide cam and telescoping arm requirements. It appears that to utilize this arrangement over any extended period of days or seasons, and even during large changes of sun angle during some days of the year, the reflector would also require some form of rocking or pivoted reorientation to vary the angular position of the mirror, in addition to utilizing the cam and telescoping collector-support arm arrangement.

It is an object and feature of the present invention to provide a relatively simple solar energy concentrating and collection arrangement and method which enables the employment of a fixed reflector and simply movable collector while providing for practical year-round utilization during the major insolation periods in each day of the year.

It is a further object and feature of a further aspect to provide a building with a fixed roof which serves as a year-round effective reflector concentrator for a movable collector which may be moved to optimize the collector of solar energy from the roof reflections.

Still a further object and feature of another aspect of my invention is to provide a method and apparatus for solar energy concentration and utilization, which may be utilized on a year-round practically effective basis at various latitudes, while enabling the use of a reflector which may be fixed for a given latitude position.

Another object and feature is to enable the year-round practical concentration and collection of solar energy striking a roof without requiring passage of heat transfer fluid along and within the roof surface, as in flat plate-type solar collector arrangements.

Still other objects, features and attendant advantages will become apparent to those skilled in the art from a reading of the following detailed description of a physical embodiment and mode of practice of the invention, taken in conjunction with the accompanying drawings, wherein:

FIG. 2 is a schematic view of the pivoted collector and the over-all heat exchange system of the embodiment of FIG. 1, showing the collector in more detail and clarity.

FIG. 3 is a section view taken on line 3—3 of FIG. 2.

Figure 1:
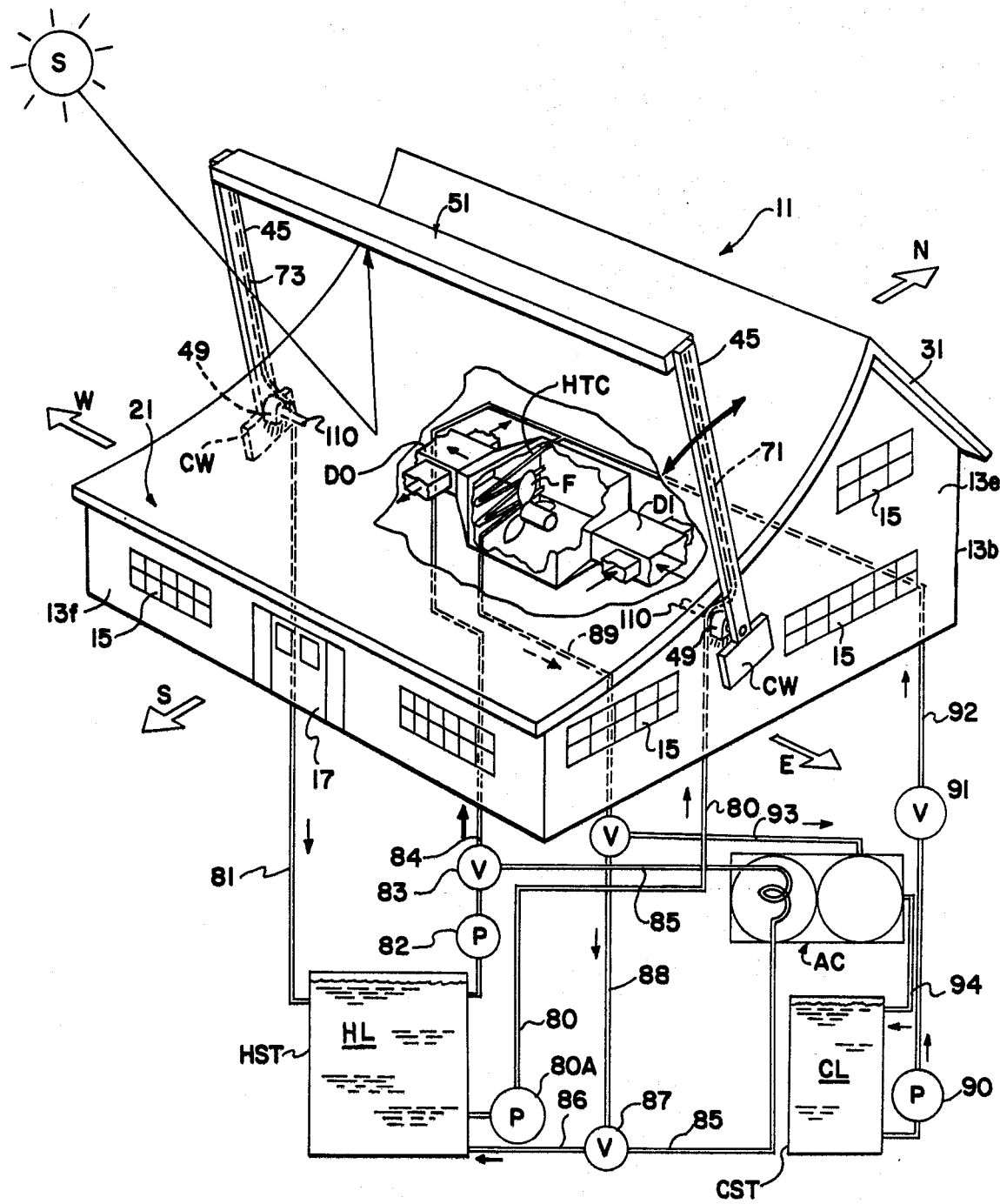
FIG. 1 is a schematic view of a building, such as a house, factory, school, etc., embodying my invention.

Referring now in detail to the Figures of the drawings, a heat utilization building structure, such as a house, school, factory, etc., generally indicated at 11, has a curved roof/reflector-concentrator surface 21, and may also have a further roof surface or surfaces of any desired configuration as indicated at 31. The extent of roof surface 21 is generally dependent upon the amount of solar energy needed for a given desired use. For maximum energy collection from a given roof size, the entire roof may be formed as a reflector-concentrator 21. Windows 15 may be provided in walls 13f, 13e, 13b, as desired.

Roof 21 may be formed of any suitable solar reflective material, such as metal, glass, plastic, and such materials may be of load-bearing type and provide some, a major portion, or all of the roof surface construction strength or may be of nonload-bearing type as, for instance, a thin reflective coating on a load-bearing substrate. The desired curvature of roof/reflector-concentrator 21 may be formed as a smooth curve or as straight or curved line segments. For instance, a curved metal roof surface may be formed in one continuous sweep, or in several panels, or various normally straight panels of metal, glass, plastic, etc. may be utilized in suitably joined relation to form the desired over-all curved shaped roof/reflector-concentrator surface 21. The roof 21 may also be only partially reflective in parts thereof or in whole, if so desired, in order to provide for natural lighting of the interior of the building by light passage through the roof 21. Similarly, the section 31 of the roof may also transmit light to the building interior if so desired.

Figure 5:
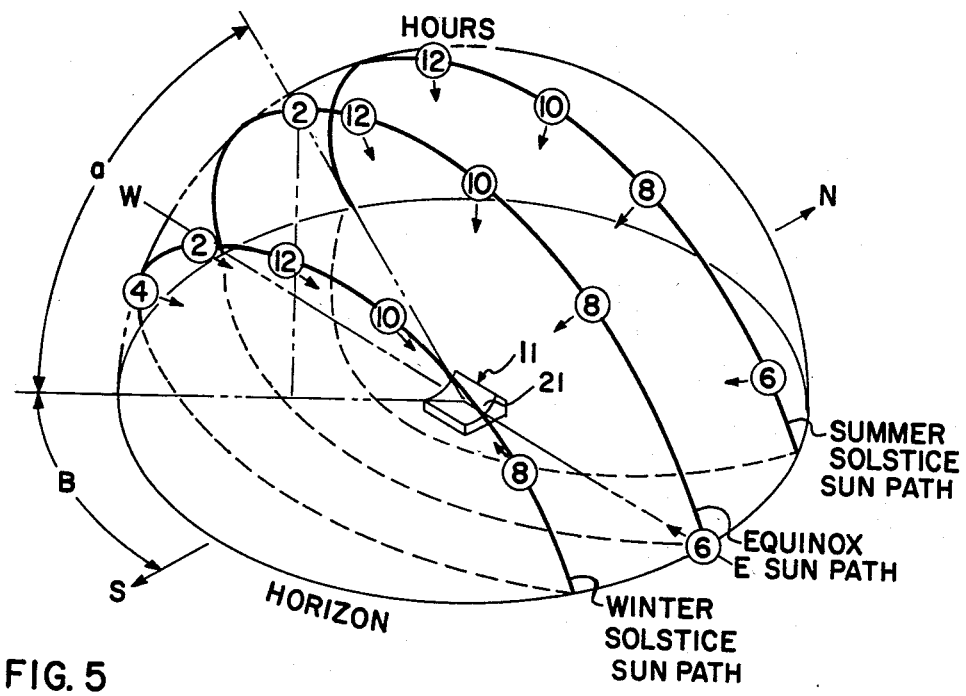
FIG. 5 is a conventional sun path diagram in perspective, showing the relative passages of the sun in the sky vault with respect to the embodiment of FIG. 1, and its horizon, for a location of approximately 40° N latitude.
Figure 6:
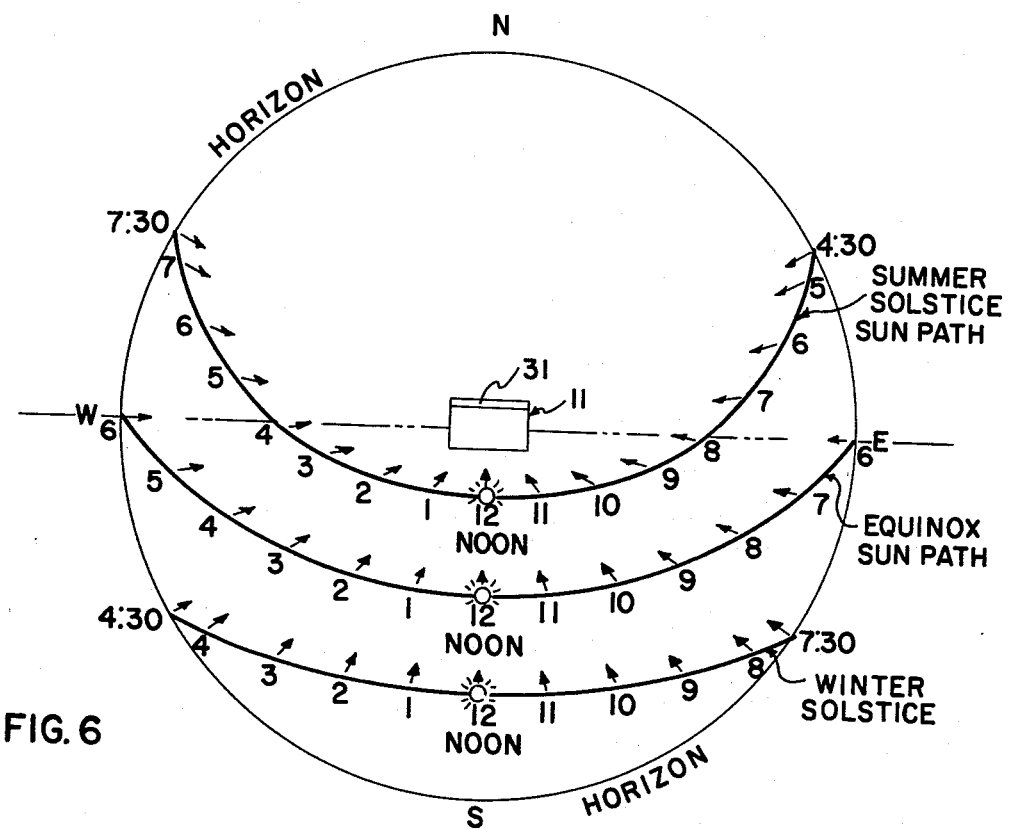
FIG. 6 is a conventional sun path diagram, depicting the path of the sun within the sky vault in FIG. 4 as projected onto a horizontal plane, with the horizon represented by a circle with the building solar collector arrangement of FIG. 1 at the center.

The roof/reflector-concentrator 21 faces and is inclined toward the South, with its opposite ends oriented directly East-West, as shown in FIGS. 1, 5 and 6.

Roof 21 reflects and concentrates solar energy into a zone of maximum confluence which varies in position as a function of the angle of the sun with respect to the horizontal, as measured in a North-South vertical plane passing through the roof 21. A solar energy collector 51 is movably mounted, as by pivot arms 45, for back-and-forth movement in a North-South direction above the roof 21, as shown generally in FIGS. 4 and 4A.

The collector pivot support arms 45 are pivoted along a horizontal East-West line which may extend beneath, above or at the surface of reflector 21, with generally only small differences in effectiveness of the reflector 21/collector 51 assembly. In the illustrative embodiment the arms 45 are mounted on pivot support 49 which lie beneath the surface of the roof reflector 21, and on a line TR (see FIG. 4A) forming a tangency line between the arc segments SR1 and SR2 formed by the two radii R1 and R2. In an illustrative embodiment, as generally shown, the ratio of the reflector chord/length subtended area versus the effective collection area of the collector is approximately 9 to 1, thereby providing a maximum feasible concentration or amplification factor of no more than 9. However, other factors, such as angle of inclination, and interference of the collector 51 in passage of the sun's rays to the reflector 21 (as at summer periods), reduce the maximum possible value to a lesser possible value for various solar angles. This factor further depends upon the extent of interception of the zone of solar reflection confluence by the collector 51, as will be subsequently discussed in more detail.

Arm and collector assembly 45, 51 may be desirably suitably counterweighted, as by counterweights CW, and are desirably interconnected at the pivot zone by a torque tube or shaft 110 for desired added rigidity.

Collector 51 may be suitably formed with a plurality of laterally side-by-side fluid flow heat transfer tubes 54, through which a suitable fluid, such as water, gas, etc. may be flowed for collection of the reflected solar energy from reflector 21. Headers or manifolds 55, 57 may be employed at either end for interconnecting the parallel flow tubes 54 with common feed and return conduits 71, 73 mounted on the two end support arms 45.

As shown in FIG. 3, the collector 51 is formed with its black body energy absorption tubes 54 facing toward the pivot axis of the arms 45/collector 51 assembly, and thereby facing the solar reflection thereto from reflector 21 at a given proper angle of this assembly. Collector 51 preferably is insulated at its outer surface facing away from reflector 21 and the pivot axis of the collector 51, as by insulation 52, with a rigid opaque U-shaped cover plate 53. A solar energy transparent cover glass plate or plates 55 may be secured beneath the energy absorption tubes 54, and the entire assembly may be secured together as by threaded studs secured as by welding to the cover plate 53 at spaced longitudinal intervals along its length, with securing nuts and securing brackets holding the glass plate 55 and headers 55, 57 in place, the glass plate being preferably sandwiched between two layers of elastic shock-resistant material 69, such as soft rubber.

Fluid feed and return lines 71, 73 may be suitably connected to a desired heat utilization system, such as a heat storage and building interior heating arrangement, and/or a cooling system, such as one based on absorption cooling principles. Alternatively, various machinery may be caused to perform work by the solar heat transferred to the fluid in collector 51, or other desired and suitable heat derived work may be performed. With this invention, fluid temperatures, such as for water as the fluid, may be raised to as high as 300° F. or more, dependent on fluid flow rate, relative sizes of collector and reflector, etc. Practical heating and absorption cooling may be accomplished well within and below this temperature extent for the fluid L flowed through the collector 51.

As an illustrative example, a liquid fluid such as water may be pumped by a pump 80 through lines 71, 54 and 81 to a hot liquid storage tank HST, in which the hot liquid is stored for subsequent heating or cooling use as desired. For heating of the interior of building 11, or other desired area, a conventional hot water heating system may be employed, as with a pump 82, two- or three-way valve 83, conduit 84, heat transfer coil HTC, fan F, further two- or three-way valve, conduit 88, two- or three-way valve 87 and return line 86. The fan F may pump air over the coils HTC, where it is heated and thereupon flows through ducts DO throughout the building 11, with return in the conventional fashion through ducts DI.

For cooling, an absorption cooler AC may be provided, with hot liquid HL pumped through the unit by pump P, through valve 83, conduit 85, valve 87 and return conduit 86. Cooled water is pumped through cooler AC by pump 90, through cool storage tank CST, and out through conduit 92, valve 91, conduit 92, thence through coils HTC, and return through conduit 93 to cooler AC, conduit 94 and cool storage tank CST, with the valves set for flow in the cooled liquid conduits and for closure of the conduit 84.

The pivot arms 45 may be pivoted about their axis by suitable reversible drive means. In the illustrative embodiment a motor M rotates a threaded drive screw shaft 121 through a gear reduction unit GR, the motor M and gear reduction unit GR and shaft 121 being pivotally mounted as a unit as at 125 on a suitable pivot support 127. A nut follower 123 threadedly engages drive screw shaft 121 and is pivotally secured on a torque arm 110a, in turn secured on torque tube 110. The motor M may be suitably driven as necessary to position the arm 45/collector 51 assembly at the various desired angular positions thereof during the various days of the year and the various insolation hours of each day as may be desired. If desired, suitable control means, not shown, programmed or energy-responsive, may be employed for controlling the drive motor M.

Figure 4:
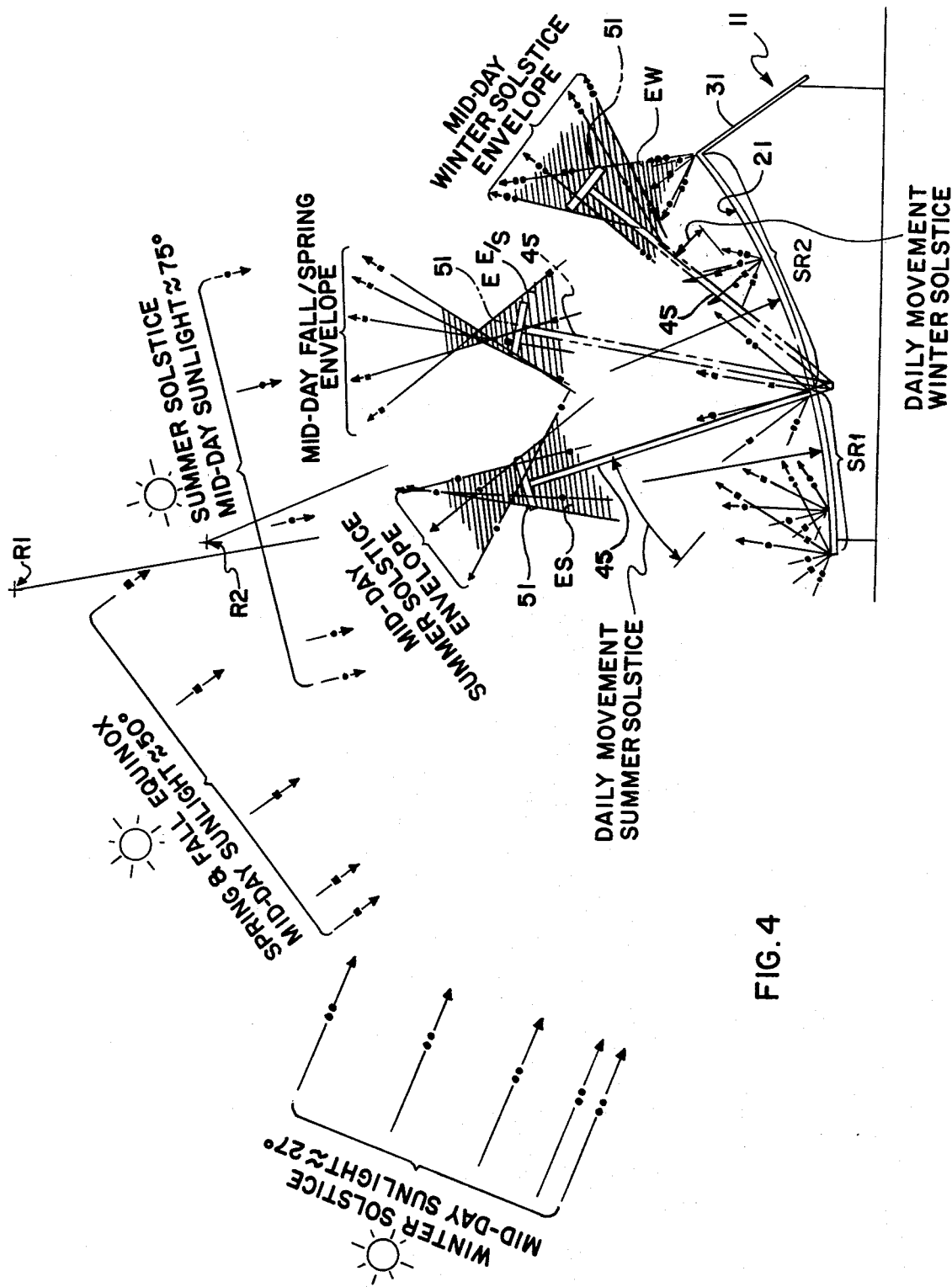
FIGS. 4 and 4A are diagrammatic illustrations of the mode of operation of the arrangement of FIG. 1 at various times during the year, FIG. 4A also showing various angle and dimensional relationships for a given preferred embodiment.
Figure 4A:
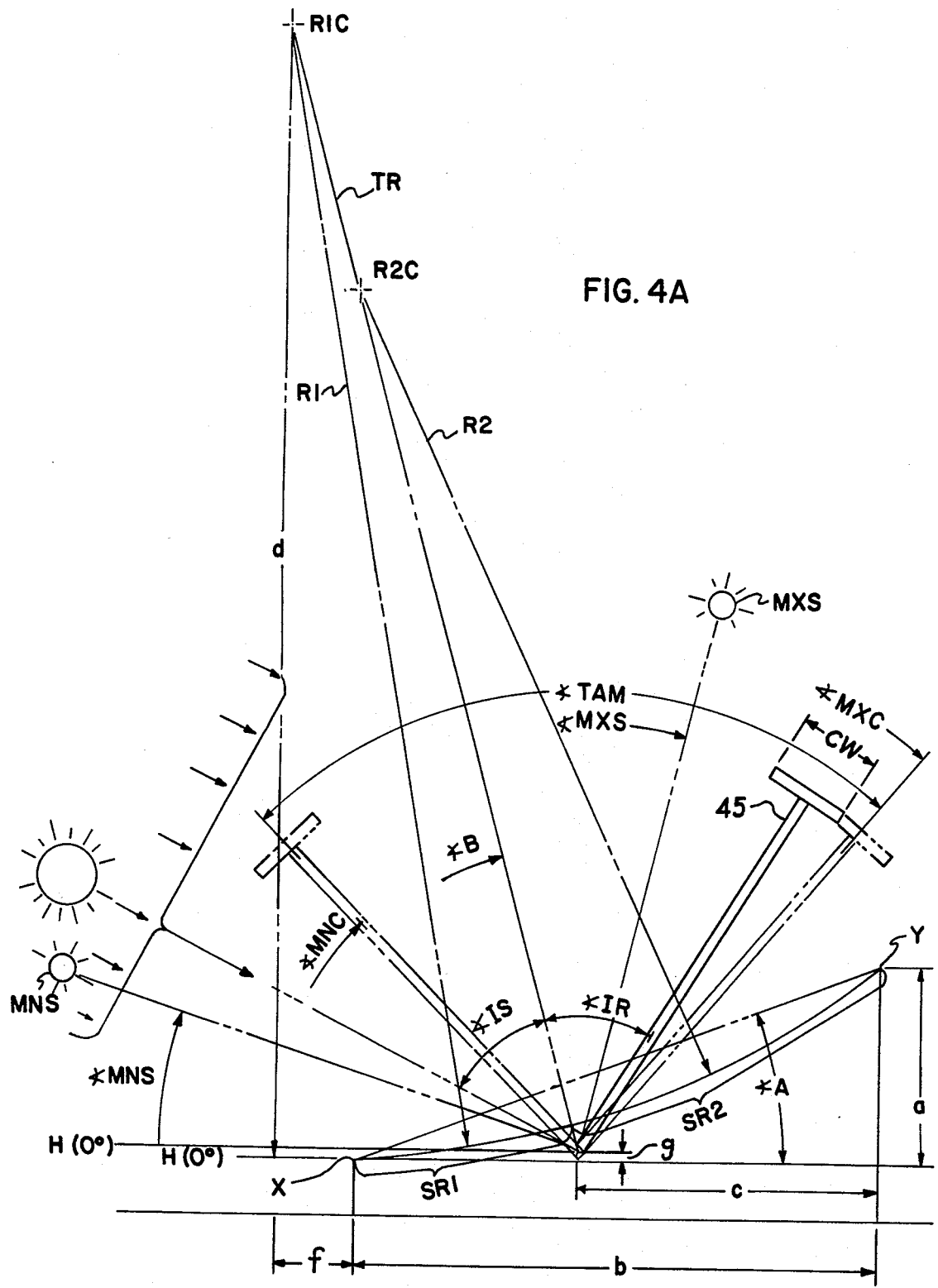

A particular illustrative embodiment for latitudes of approximately 30°–40°, such as generally illustrated, may suitably employ the following relationships, referring to FIG. 4A for reference characters and elements:

Radius R1 of front arc segment SR1 = 19.8 units
Radius R2 of rear arc segment SR2 = 15.0 units
Angle B formed by tangency radius line TR common to radii R1 and R2 = 75°
Effective width CW of collector 51 = 1.22 units
Length of pivot arm 45 = 7.2 units
Angle A formed by the chord line excending between front and rear horizontal lines X and Y = 20°
Length $a$ = 3.4 units
Length $b$ = 9.4 units
Length $c$ = 6 units
Length $f$ = 1.35 units
Length $g$ = 0.45 units
Arc segment SR1 ≈ 4 units Arc segment SR2 ≈ 6.8 units Minimum sun angle MNS desired to be accommodated by collector 51 ≈ 18°

Maximum sun angle MXS desired to be accommodated by collector 51 ≈ 104°

Minimum required angle MNC for collector/arm assembly 51, 45 to accommodate maximum desired sun angle (of approximately 104°) ≈ 46°

Maximum required angle MXC for collector/arm assembly 51, 45 to accommodate minimum desired sun angle (of approximately 18°) ≈ 132°

For normal practical purposes the general approximate desired angular position for the collector 51/arm 45 assembly may be determined for a given sun angle by forming the angle IR between the arm 45 and the tangency line TR approximately equal to the angle IS formed between the incoming sun rays and the tangency line TR. However, if desired, a more precise determination of arm 45 for each solar angle may be more precisely determined for a given reflector 21, either by empirical plotting, or computer or other mathematical analysis of the confluence lines along the front-to-back extent of the reflector with the collector positioned for the particular desired maximizing of reflected solar energy interception at the various sun angles, with such compromises between maximums at various angles as may be desired for a given location, combustion, and utilization.

Desirably, arc segments SR1 and SR2 are smoothly joined at a common point of tangency, a common tangency radius line TR extending through the centers of radius R1C and R2C for the two radii R1 and R2. As noted above, in an illustrative embodiment suitable for latitudes 30°–40°, this line TR suitably forms an angle of 75° with the horizontal H, and such angle approximates the summer solstice midday angle of the sun at 40° latitude. This tends to maximize the solar energy concentration or amplification factors during the summer period at some degree of minimizing of the winter solar energy concentration or amplification factors by the reflector/collector assembly 21, 51. Other angles of line TR may be suitably employed with different weighting of these factors.

Various zones of reflected solar energy confluence for the illustrative embodiment are schematically shown in FIG. 4, the zones being only approximately shown and representing the midday times at approximately 40° N latitude for the sun's position at noon on each of the winter solstice, summer solstice and spring and fall equinoxes. I have found that a good ratio of energy concentration and collection can be obtained over the major insolation periods of each day of the year by employing a pivotally mounted collector, with the pivot line parallel to the centers of radius of the reflector 21 and by utilization of two or more radii for respectively two or more of the sections of the roof reflector 21. In the illustrative example, two radii are satisfactorily employed, the smaller radius R2 defining the rear reflector surface arc segment SR2 and the larger radius defining the reflector surface arc segment SR1, as shown schematically in FIG. 4A. Referring again to FIG. 4, it will be noted that at no sun angle or reflection zone does the multiple-radii generated reflector concentrator 21 form a single focus line, but instead forms various zones of confluence, and the size and location of the zones of confluence vary with the sun angle, which in turn varies both over the period of a year and during each day. In this respect, inspection of the sun path illustrations for the illustrative 40° N latitude location readily show the requirements imposed on the system in given days over the period of a year. For instance, at summer solstice, the sun's apparent path causes rising and setting behind the reflector 21 and the sun path crosses to the frontal zone of the reflector 21 at approximately 8 AM, with a zenith angle of approximately 75° at midday, and again crosses to a zone behind the reflector 21 at approximately 4 PM. At the opposite extreme of winter solstice, the sun is at all times of the day in front (i.e. South) of the reflector 21, although it rises later (i.e. approximately 7:30 AM) and sets earlier (i.e. approximately 4:30 PM) and has a lower zenith angle (approximately 27°, see FIG. 4). On the other hand, the spring and fall equinoxes find the sun rising at 6 AM on the East-West axis line of the reflector, setting at 6 PM on the East-West axis line of the reflector, and rising to a zenith angle of approximately 50° at midday. On all days except the fall and spring equinoxes, the center of the zone of reflection maximum confluence from reflector 21 varies throughout the day and differs on succeeding days from a low frontal zone at the summer solstice to a low rearward reflection zone at winter solstice. These zones are illustratively indicated in FIG. 4, and designated as daily movement zones for the collector 51 and its supporting pivot arms 45. In the illustrative embodiment and mode of practice of the invention, for approximately 40° N latitude, the required daily movement of the collector/arm assembly 51, 45 at the summer solstice extends from approximately 46° to 77° relative to the zero degree horizontal as measured from the North-South front of the reflector, making a total angle of desired pivotal movement of the reflector 51 of approximately 31° in order to accommodate the major solar insolation period of from approximately 7:30 AM to 4:30 PM. Less reflector movement would be required for a lesser time of effective energy collection, and vice versa. For practical purposes, this is considered to represent a good working period at summer solstice. It will be noted from FIG. 4 that the reflector can and does accommodate solar angles to a limited degree behind the 90° vertical as the indicated low zone of daily movement at summer solstice is approximately 46° and results when the sun is at approximately 7:30 AM and 4:30 PM respectively, which, as shown in FIG. 6, is in each instance substantially behind and to one side of the reflector 21. Of course, the side or end angle of inclination must also be considered, and in order to maximize solar energy collection at low end angles the same as measured in the East-West vertical plane, the reflector 21 and collector 51 should desirably be relatively long along their length, particularly with respect to the distance of the collector 51 from the reflector 21.

In the illustrative embodiment, the winter solstice envelope has a center of maximum confluence angle, (and concomitant angle of arm/collector assembly 45, 51), varying from approximately 123°–132°, or over an angle of approximately 9° for a variation of sun angle of approximately 18°–27° over the major useful insolation period of approximately 9 AM–3 PM at this time of year.

As the days approach the spring and fall equinoxes the daily excursions of movement required for the arm/collector assembly 45, 51 decrease, until at the respective two equinoxes the arm/reflector assembly 45, 51 requires no angular movement as the sun rises and sets on the East-West orientation line of the reflector axes, and forms a constant angle throughout the day as measured in a North-South vertical plane passing through the reflector 21.

In the illustrative embodiment, the solar concentration factors, or amplification factors, vary with the solar angle, this concentration or amplification factor having a minimum possible value at winter solstice and a maximum possible value at midday summer solstice, as will be noted from examination of FIG. 4. This maximum possible concentration factor is a function of the angle of inclination of the sun with respect to the chord line extending between the front and rear line zones X and Y (see FIG. 4A), the lower the angle of inclination the lesser possible maximum possible concentration or amplification factor. In addition, the concentration of amplification factor is a function of the extent of coverage or interception of the zone of confluence of the reflected solar energy at a given sun angle, and it is therefore desirable to maximize this extent of interception at the various angular positions of the sun and the collector/arm assembly 51, 45, insofar as is practical and economical.

I have found that my mounting the arm 45 on a pivot axis near the surface of reflector 21, as at, above or beneath the reflector surface, an adequate extent of interception of the various zones of solar energy confluence may be obtained for the collector 51. In the illustrative embodiment the horizontal pivot line for pivot support arms 45 is disposed slightly beneath the effective reflective surface of reflector 21, and is located approximately on an extension of the tangency radius TR line joining arc segments SR1 and SR2. However, this arm pivot line may if desired be otherwise located for a given embodiment, as for instance above or at the surface of reflector 21, and may lie other than on the tangency radius line TR. In the particular illustrative embodiment, with the arm 45 pivot line disposed beneath the roof surface 21, the pivot supports 49 may if desired by suitably carried by ceiling rafters, beams or trusses, or such may be mounted interiorly or exteriorly of the building on other suitable support means such as posts, pilings, etc.

It will, of course, be appreciated that all of the drawings are only illustrative and are not themselves intended to be illustrated necessarily in true size relationships, although such is to some extent approximately the case, as particularly in FIG. 4A. This observation applies also to the zones of solar reflection confluence and the collector 51 interception zones, although such are shown to give a fairly indicative illustration of the principles and mode of operation and practice involved.

Referring now again to FIG. 4, for the winter solstice midday position of the sun at approximately 27° and with the collector 51/arm 45 assembly at approximately 132°, for the illustrated embodiment the concentration or amplification factor may approach approximately 6, while having a desired high concentration or amplification factor of approximately 7 at summer solstice midday and approximately 6.2 at midday of spring and fall equinoxes. The concentration factor values are, of course, only illustrative and may vary with other embodiments with their respective dimensional relationships.

The typical specific illustrative example proportions as previously shown and described, particularly with respect to FIG. 4A, are, as previously noted, for an embodiment and practice of the invention primarily within a latitude of approximately 30° to 40°. Also, as noted, the embodiment is arranged such that the concentration factors for summer solar energy collection are maximized, to some expense at the expense of winter concentration factors, in order to maximize available solar-derived heat energy for air conditioning, (although still enabling the satisfaction of minimum requirements for heating during at least the major portion of most winter conditions). For lower latitudes of for instance approximately 20° to 30°, where the angle of the sun is high during winter, and where capture of solar energy in the summer for air conditioning purposes is even more important, the same geometry of collector 51, arms 45, and reflector 21 assembly can be employed, insofar as length and arrangement of radii and pivot points are concerned, except that the entire reflector, pivot arm, collector assembly can be tilted about line X to a lower more suitable angle of chord line X-Y, determined by the given latitude location. Utilization of the arrangement at higher latitudes of for instance approximately 40° to 50°, with winter heating being more of a requirement than summer cooling, generally the same geometric configuration can be employed at a greater tilt angle for chord line X-Y, to as great an angle as 40°, dependent on the particular latitude location.

While the invention has been illustrated and described with respect to a particular illustrative embodiment and mode of practice, and various possible modifications have been described, it will be appreciated that various further modifications and improvements may be made without departing from the scope and spirit of the invention. For instance, the reflector 21 may be formed as a reflector only, and not as a roof of a building, although this is normally the most advantageous and preferred embodiment. Further, while a pivoted support arm arrangement 45 is illustrated and preferred for supporting and moving the collector 51 through the desired zone of movement, various other collector supporting and movement arrangements may be employed. Also, while two radii R1 and R2 are employed in the illustrative example, especially for simplicity of design and construction, more than two radii may be suitably employed, graduating from longest at the front (e.g. the portion facing the Equator) to shortest at the rear zone of the roof, and may in fact be constructed with a continuously varying radius from front to back of the collector 21. Such a continuously varying radius collector 21 may, however, be beyond the desired complexity for normal construction and the dual radius construction is considered to be adequate and most easily constructed from a practical standpoint. Accordingly, the invention is not to be limited to the particular illustrative embodiment and mode of operation and practice, but only by the scope of the appended Claims.

I claim:
1. The method comprising
reflecting and concentrating a portion of solar energy in light form from a concave concentrating light-transmitting reflector surface area onto a collector spaced thereabove,
and passing a further portion of said solar energy in light form through the same said light-transmitting reflector surface area for aid in illuminating the zone beneath said concentrating reflector surface area,
reflecting and concentrating said solar energy from a concave reflector surface onto a longitudinal col- lector movable in a direction across the width of said concave reflector surface.

2. The method according to claim 1,
reflecting said solar energy from a reflector surface forming a roof of a building enclosure,
aiding in illuminating a portion of the interior of said building enclosure by said further portion of said solar energy passing through said reflector surface,
and utilizing a portion of said reflected solar energy collected by said collector in energy use relation within said building enclosure.

3. The method according to claim 2,
said utilizing of said collected reflected solar energy in energy use relation within said building enclosure being effected by passing a fluid through said collector to absorb solar energy striking said collector, and subsequently effecting heat transfer within said building enclosure of energy derived from the resultant heated said fluid.

4. The method according to claim 3,
said subsequent heat transfer being a positive heating transfer of energy to the interior air of said building enclosure.

5. The method according to claim 3,
said subsequent heat transfer being a negative cooling transfer of energy from the interior air of said building enclosure, through prior intermediate transformation of the energy from said solar heated fluid to effectively chill a further fluid which is passed in air-cooling relation within said building enclosure.

6. The method comprising
reflecting and concentrating a portion of solar energy in light form from a concave concentrating light-transmitting reflector surface area onto a collector spaced thereabove,
and passing a further portion of said solar energy in light form through the same said light-transmitting reflector surface area for aid in illuminating the zone beneath said concentrating reflector surface area,
reflecting said solar energy from a reflector surface forming a roof of a building enclosure,
aiding in illuminating a portion of the interior of said building enclosure by said further portion of said solar energy passing through said reflector surface,
and utilizing a portion of said reflected solar energy collected by said collector in energy use relation within said building enclosure.

7. The method according to claim 6,
said utilizing of said collected reflected solar energy in energy use relation within said building enclosure being effected by passing a fluid through said collector to absorb solar energy striking said collector, and subsequently effecting heat transfer within said building enclosure of energy derived from the resultant heated said fluid.

8. The method according to claim 7,
said subsequent heat transfer being a positive heating transfer of energy to the interior air of said building enclosure.

9. The method according to claim 7,
said subsequent heat transfer being a negative cooling transfer of energy from the interior air of said building enclosure, through prior intermediate transformation of the energy from said solar heated fluid to effectively chill a further fluid which is passed in air-cooling relation within said building enclosure.

10. A building structure comprising
an enclosure having a roof,
said roof having a fixed concavely curved reflector-concentrator surface,
and a collector movable above said reflector-concentrator surface to enable concentration of solar energy onto said collector,
said concavely curved reflector-concentrator having a concavely curved concentrating portion thereof partially and less reflective than the remainder of said reflector-concentrator and lying in light-transmitting relation to an interior portion of said enclosure as well as in energy-concentrating light-reflecting relation with said collector.

11. A building structure according to claim 10,
said concave reflector-concentrator comprising a concave generally semi-cylindrical reflector,
said collector having a longitudinal extent extending along the length of said reflector and disposed in spaced relation from the effective reflecting surface of said reflector.

12. A building structure according to claim 10,
said semi-cylindrical reflector having a longitudinal axis extent disposed in a substantially East-West direction.

13. A building structure comprising
an enclosure having a roof,
said roof having a fixed concavely curved reflector-concentrator surface,
and a collector movable above said reflector-concentrator surface to enable concentration of solar energy onto said collector,
and concavely curved roof reflector-concentrator having a portion thereof only partially reflective and lying in light-transmitting relation to an interior portion of said enclosure as well as in energy-concentrating light-reflecting relation with said collector.

14. A building structure according to claim 13,
said roof reflector-concentrator being only partially reflective along substantially its entire curved light-reflecting and concentrating surface.

15. A building structure according to claim 14,
said concave reflector-concentrator comprising a concave generally semi-cylindrical reflector,
said collector having a longitudinal extent extending along the length of said reflector and disposed in spaced relation from the effective reflecting surface of said reflector.

16. A building structure according to claim 13,
said concave reflector-concentrator comprising a concave generally semi-cylindrical reflector,
said collector having a longitudinal extent extending along the length of said reflector and disposed in spaced relation from the effective reflecting surface of said reflector.

17. A building structure according to claim 14,
said roof having a further surface other than said reflector-concentrator surface.

18. A building structure according to claim 17,
said further surface having a light-transmitting portion and lying in light-transmitting relation to an interior portion of said enclosure.

* * * * *